Jan. 5, 1937.  W. J. PARKS  2,066,362
SCREENING APPARATUS AND THE LIKE
Filed May 22, 1934   3 Sheets-Sheet 1

Inventor,
Walter J. Parks,
by Walter P. Guyer
Attorney.

Inventor,
Walter J. Parks,
by Walter P. Guyer
Attorney.

Jan. 5, 1937.  W. J. PARKS  2,066,362

SCREENING APPARATUS AND THE LIKE

Filed May 22, 1934  3 Sheets-Sheet 3

Inventor,
Walter J. Parks,
by Walter P. Geyer
Attorney.

Patented Jan. 5, 1937

2,066,362

UNITED STATES PATENT OFFICE 2,066,362

SCREENING APPARATUS AND THE LIKE

Walter J. Parks, Buffalo, N. Y.

Application May 22, 1934, Serial No. 726,986

24 Claims. (Cl. 209—326)

This invention relates to certain new and useful improvements in vibrating mechanisms or apparatus for use in connection with the screening of materials and like operations.

One of its objects is to provide an efficient apparatus of this character which is completely balanced and self-compensating and which is so designed as to eliminate vibration to the surrounding supporting structure.

Another object of the invention is to so design and construct the gyrating apparatus that the center of mass of the entire system of gyrating and rotating weights is rendered coincident with the actual or concentric axis of the drive shaft of the apparatus.

A further object is the provision of a balanced gyrating apparatus composed of a plurality of resiliently supported bodies having sets of bearings symmetrically displaced and eccentric to each other and engaged by a drive shaft, and wherein the axis of rotation lies midway between the axes of the center lines of the bearings.

Other features of the invention reside in the construction and arrangement of parts hereinafter described and particularly pointed out in the appended claims.

In the accompanying drawings:—

Figure 1:
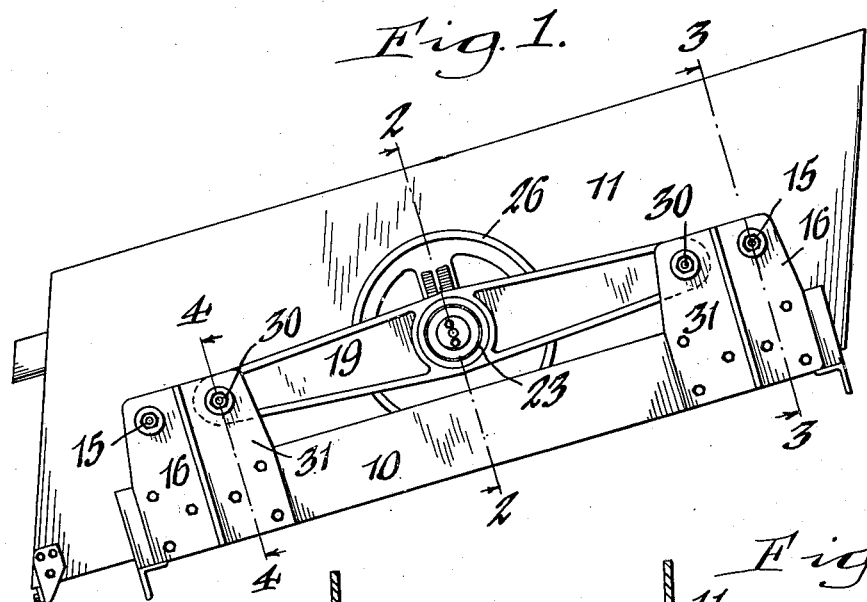
Figure 2:
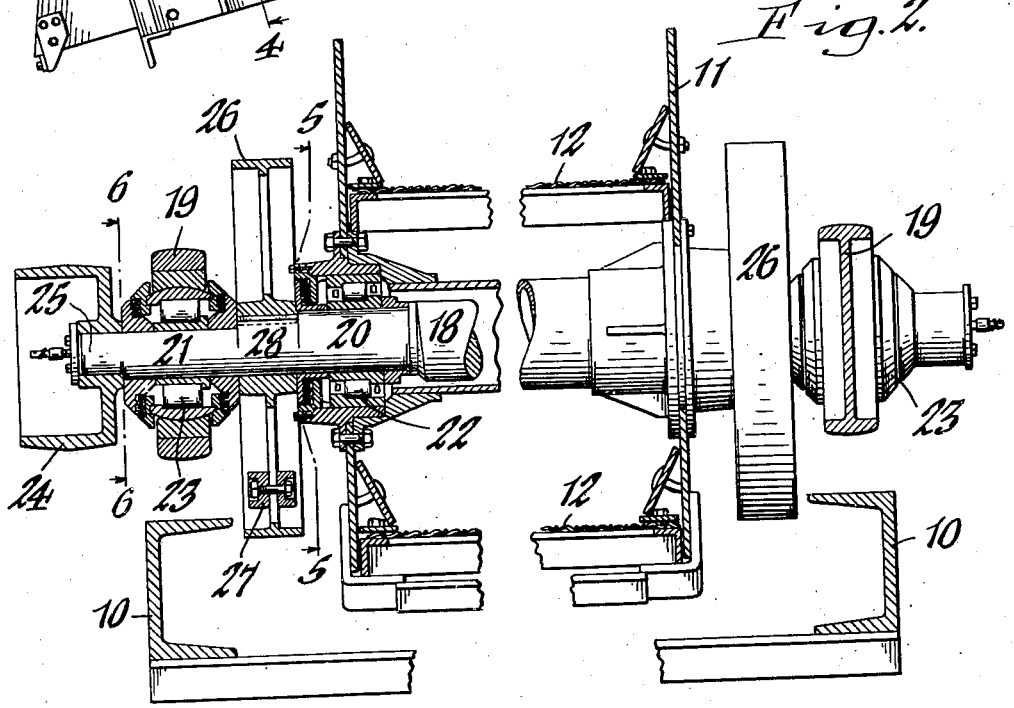
Figure 3:
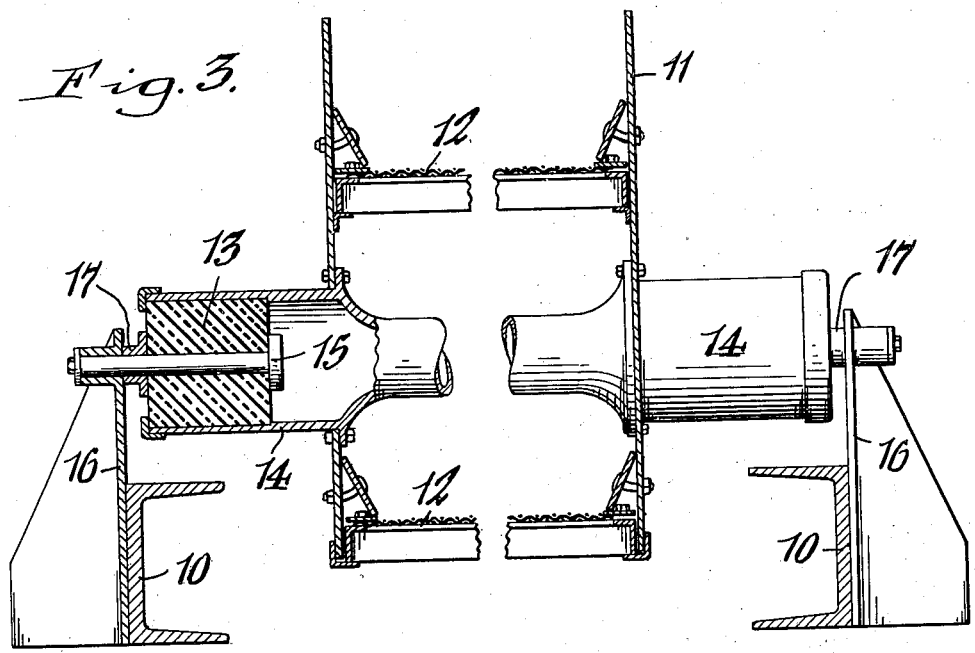
Figure 4:
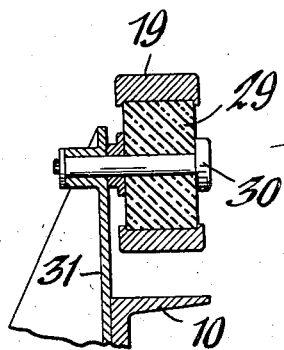
Figure 5:
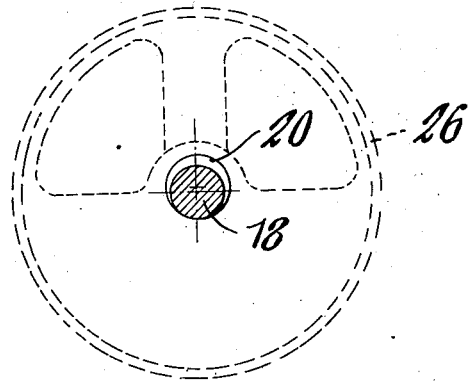
Figure 6:
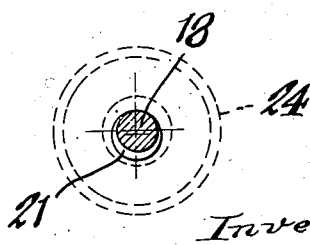
Figure 7:
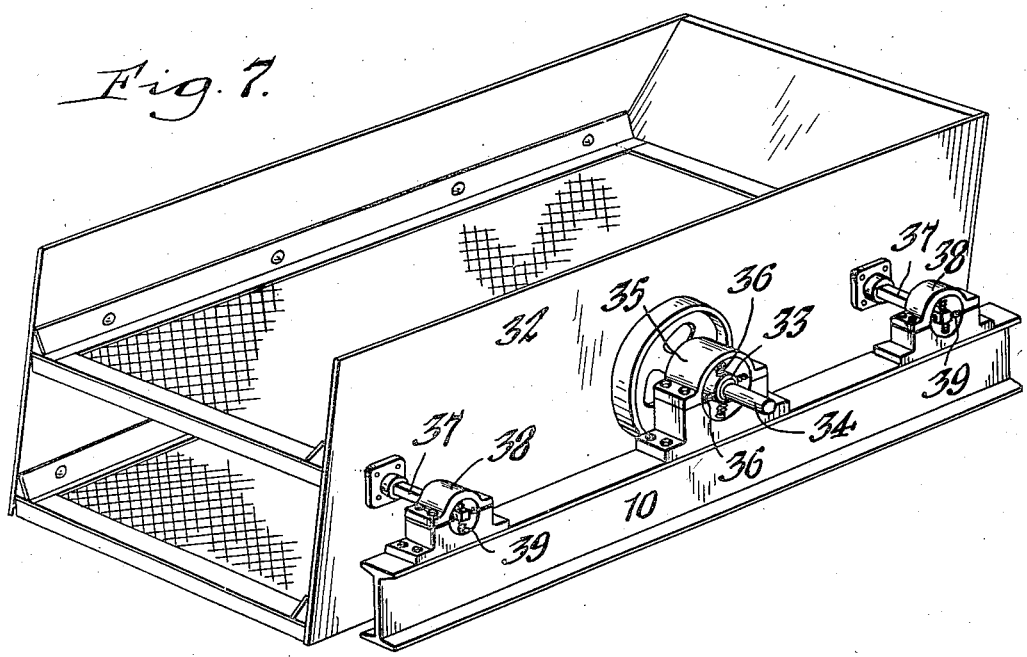
Figure 8:
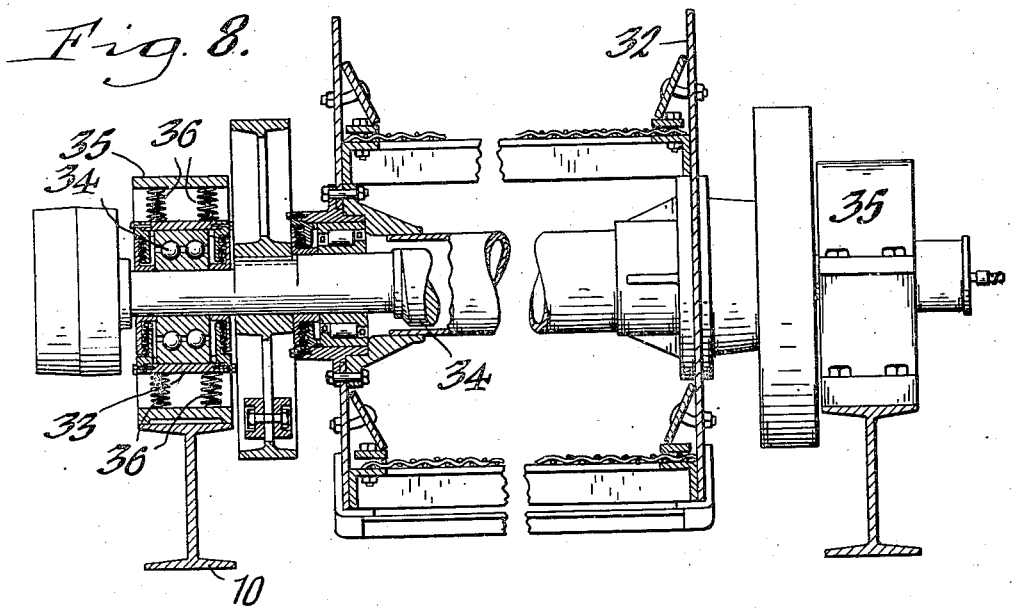

Fig. 1 is a side elevation of a vibrating screen embodying my invention. Fig. 2 is an enlarged fragmentary transverse section taken substantially in the plane of line 2—2, Fig. 1. Fig. 3 is an enlarged transverse vertical section taken on line 3—3, Fig. 1. Fig. 4 is an enlarged fragmentary cross section taken in the plane of line 4—4, Fig. 1. Figs. 5 and 6 are cross sections taken on the correspondingly numbered lines in Fig. 2. Fig. 7 is a perspective view of a shaking screen showing a modified embodiment of my invention. Fig. 8 is an enlarged fragmentary cross section thereof similar to Fig. 2.

Similar characters of reference indicate corresponding parts throughout the several views.

By way of example, my invention has been shown in connection with an apparatus for screening materials, the numeral 10 indicating the stationary base or supporting frame which may consist of channel rails or the like mounted on appropriate supports (not shown), and 11 indicating the screen body or frame which is freely or resiliently suspended from the base and to which a gyratory motion is imparted for effectually screening the materials delivered thereto. As shown, the screen-body is provided with two screen decks 12, but any number may be employed as desired.

Adjacent its ends the screen body 11 is resiliently supported from the base rails 10 in any suitable manner, that shown in the drawings being preferable and consisting of elastic bushings 13 of rubber or like material arranged in sleeves or housings 14 formed at the ends of transverse tie members secured to the side plates of the screen body. Extending outwardly from these bushings are attaching bolts 15 which are connected to corresponding supporting brackets 16 secured to the base rails, spacing sleeves 17 being provided between these brackets and the opposing faces of the respective bushings, as seen in Figure 3.

The means for gyrating the screen body is preferably constructed as follows:—

The screen body is balanced or supported for gyratory movement midway of its ends on a transverse driving shaft 18 which passes through the side walls of said body and which is supported at its opposite ends in a free-floating fashion in companion, resilient, gyratory supporting bodies 19. This drive shaft is continuous and uninterrupted and is provided adjacent its opposite ends with a plurality of oppositely-disposed offset portions 20 and 21 which are eccentric to the actual or concentric center line of the shaft and which are preferably of equal magnitude and are 180 degrees apart. In the drawings, two opposing eccentric portions are formed adjacent each end of the shaft, the inner one 20 engaging a corresponding roller or like anti-friction bearing 22 fitted in the adjoining side wall of the screen body and the outer eccentric portion 21 engaging a similar bearing 23 fitted in the adjoining gyratory supporting body 19. By preference, the respective bearings 22, 23 are located substantially at the center of gravity of the respective gyratory bodies 11 and 19. At one end the driving shaft 18 is provided with a pulley 24 for driving connection to a source of power and the pulley-receiving portion 25 of this shaft is concentric with the actual center thereof.

Also mounted on the driving shaft and preferably at opposite sides of the screen body 11 are fly wheels 26 provided with suitable counterweights 27 which are mounted on the web portions of such wheels for adjustment radially thereof. These fly wheels are keyed or otherwise fixed on those portions of the shaft indicated at 28 and these portions, like the pulley-receiving portion 25, are concentric with the actual center line of the shaft, so that these rotating parts of the apparatus are axially alined.

The gyratory supporting bodies 19 for the drive shaft 18 may be resiliently supported on the stationary base 10 in any suitable manner or similar to the means employed for supporting the screen body, as by rubber bushings 29 fitted in the ends of each body and connected by attaching bolts 30 to brackets 31 secured to the base rails 10.

In Figures 7 and 8, I have shown a modified arrangement for resiliently supporting the gyratory bodies, the numeral 32 indicating the gyrating screen frame and 33 the free-floating gyrating bodies in which the drive shaft 34 is mounted. In this embodiment of the invention, each body 33 is substantially in the form of a sleeve or tubular support containing a bearing 34 for the shaft and resiliently disposed within a housing 35 attached to the base-rails 10 through the medium of interposed springs 36, these springs being disposed radially in substantially vertical and horizontal planes. The resilient supports for the ends of the screen body 32 are similar to those just described, each including an attaching bar or rod 37 projecting from the body and extending into a housing 38 secured to the corresponding base-rail. Interposed between this housing and the attaching bar are radially-disposed springs 39.

By this construction and arrangement of parts there is provided a drive shaft 18, supported by a plurality of resiliently supported bodies 11 and 19, one of the bodies constituting a screen element, said shaft having offset portions 20, 21 thereon so that the connections of said shaft to said bodies do not lie in the same axis but are displaced with reference to each other. The shaft with its attached bodies can then be considered an element mounted for rotation, and having masses equal to those of the resiliently supported bodies attached to the shaft at the points of connection of the said bodies and shaft. The center of mass of the shaft, so constituted, will be on an axis between the axes of the two offset portions of the shaft, the relative distance between the axis through the mass center and the axis of either offset portion being dependent on the magnitude of the masses attached to each offset portion and the magnitude of the mass represented by the shaft itself with all attached parts such as flywheels and pulleys. If the shaft, as resiliently supported, is revolved at a relatively high speed, it will revolve about the axis through the mass center of the entire system and not about the axis through either of the sets of bearings mounted on the offset portions, so that each of the offset portions with its attached elements will revolve eccentric to the axis of revolution and the eccentricity in each case will be equal to the distance between the axis through the mass center of the entire system and the axis through the offset portions. In the above case, if we assume that, with the exception of the offset portions, all parts of the shaft are symmetrical about its centerline, then we have a system of three masses represented by the screen body mounted on one offset portion, its mass being considered concentrated at that point, the companion resiliently supported bodies whose mass is considered concentrated on the centerline of the other offset portion and the shaft having its mass concentrated on an axis between the other two. If the axis through the center of the shaft is midway between the axis of the other two masses and the masses are equal, the center of mass of the combination will lie in the axis of the shaft. Then when the shaft is rotated at a high speed, it will revolve about the axis through the mass center of the shaft, this axis coinciding with the axis of the shaft itself. Then any parts on the shaft such as the drive pulley will revolve about the same center and if concentric thereto will revolve without any gyratory or eccentric motion. If the masses of the resiliently supported bodies are not equal, then the axis of rotation of the system will not be about the centerline of the shaft and the drive pulley would have to be mounted eccentrically on the shaft so that its center coincided with the center of rotation in order that the face would run true to receive the driving belt. It will also be noted in the latter case that the resiliently supported bodies would not have motions of the same amplitude, but would have motions of an amplitude proportional to their relative distances to the center of rotation through the mass center.

It will also be noted that the axis of revolution being located between the axis through the offset portions carrying the resiliently supported bodies, these bodies will have an eccentric motion in opposite directions.

As illustrated in the drawings, the relative masses of the screen bodies and the companion bodies may be considerably different and so, if no other means were used, the center of rotation of the system would be close to the axis through the screen body, giving the body a smaller amplitude of motion than the companion bodies. If the difference in amplitude is considerable, the difference in pressure on the resilient supports 13, 29 of the two may be considerable, depending on the stiffness of the resilient supports, and introduce some vibration to the screen supports. If the machine were to be used in this case, the resilient mountings would preferably have to be so proportioned in stiffness that the resulting pressure created by the relatively different amplitudes of vibration would be equal. In order to use resilient mountings of the same stiffness it is necessary that the amplitudes of vibration of the supporting bodies be equal which necessitates the center of rotation being midway between the two offset portions. Let it be assumed that the axis of rotation will coincide with the axis of the shaft which is midway between the axis of the offset portions. The shaft and its attached revolving parts will then not enter into the balancing as they are balanced themselves with reference to the center of rotation. Also assume that the mass of the screen body is larger than the mass of the companion bodies. To bring the center of mass coincident with the desired axis of rotation through the shaft center, additional mass must be added and disposed so that it will be on the same side of the center as the lighter masses of the companion body. This is done by means of wheels having off-balance weights, keyed to the shaft with the heavy side of the wheel extending outwardly in the direction of the eccentricity of the lighter companion body. By properly proportioning the counter balancing elements, the center of mass can be made coincident with the center of the shaft midway between the offset portions so that when the shaft revolves, the resiliently supported bodies will have a motion of equal amplitude but with instantaneous displacements opposite in direction. Under such conditions, the resilient mountings, being equal in stiffness, will produce equal pressure on the base frame and so prevent vibrations being set up in the same. The latter construction, using balance wheels, therefore, enables us to use a body of relatively light weight to generate pressure on its resilient supports to compensate for the pressures generated in the screen, a body of considerable weight. The action of the mechanism in this case is, therefore, independent of the mass of the companion supporting body which is merely used to convey the motion of one of the offset parts of the shaft to the resilient supports and so compensate for the similar motion conveyed to the screen body supports by its motion.

Furthermore, by the construction heretofore described, a completely balanced, self-compensating screen is provided which is reliable, durable and efficient in operation. It is further pointed out that the provision of the gyratory body or bodies 19 companion to the screen body 11 is to produce a gyration 180 degrees out of phase with such screen body, so that the change in the pressure of the resilient supports of the screen body on the stationary frame is compensated for by equal and opposite forces produced in the resilient supports of the companion gyratory bodies, the parts being properly proportioned to accomplish these results.

I claim as my invention:—

1. In a machine of the character described, a vibratory body, a substantially horizontal drive shaft extending substantially centrally through the body and having eccentrics thereon engaging bearings in said body for gyrating the same, means for resiliently supporting said body in a vertical direction at opposite sides of said shaft, and resiliently-supported gyrating bearing members for the opposite ends of said shaft, said vibratory body and said bearing members constituting floating supports for the shaft, the latter having eccentrics thereon diametrically opposed to the first-named eccentrics and engaging said bearing members, and the gravity and dynamic forces of the several parts acting in the same plane.

2. A machine of the character described, comprising a supporting frame, gyratory bearing-bodies resiliently supported on said frame, a screen frame resiliently mounted on said supporting frame between said bodies, and a drive shaft journaled in said bearing-bodies and said screen-frame and including actuating means for gyrating said screen-frame vertically in substantially circular paths, and actuating means for similarly gyrating said bearing-bodies in directly opposite phase relation to the screen frame, said screen-frame and bearing-bodies constituting floating supports for the shaft.

3. A machine of the character described, comprising a vibratory screen body, a supporting frame, a drive shaft extending transversely of the screen body and having an eccentric thereon operatively connected to said body to positively gyrate the same, resilient means disposed at opposite sides of said shaft between the screen body and the supporting frame, a second eccentric on said shaft substantially equal in magnitude of eccentricity to that of the first-named eccentric and diametrically opposed to it in phase, a bearing for said second eccentric, and resilient means for supporting said bearing on said frame, said resilient means for the screen body and said resilient means for said bearing supporting the weight of said body, said bearing and shaft in the plane of vibration of the screen body, said body and said bearing constituting floating supports for the shaft.

4. In a machine of the character described, a plurality of resiliently-supported bodies, a drive shaft solely supported by said bodies, means for resiliently supporting said bodies, said means sustaining said bodies in load-carrying position and being displaceably resilient in vertical and horizontal directions and permitting gyration of the bodies in vertical planes, and connections between said shaft and said bodies for positively and simultaneously gyrating them in opposite directions and in paths lying in planes at right angles to said shaft.

5. In a machine of the character described, a stationary base, a plurality of symmetrically-arranged gyratory bodies, means for independently resiliently supporting said bodies in load-carrying position from said base, said resilient means being displaceable in vertical and horizontal directions and permitting gyration of the bodies in vertical planes, a drive shaft extending through and solely supported by said bodies, and connections between said shaft and said bodies for positively gyrating them in opposite directions and in paths lying in planes at right angles to said shaft.

6. In a machine of the character described, a stationary base, a plurality of symmetrically-arranged gyratory bodies, means for resiliently supporting said bodies from said base, a drive shaft extending through and solely supported by said bodies, said resilient supporting means being disposed on opposite sides of said shaft and substantially in line with the shaft, and connections between said shaft and said bodies for positively gyrating them in opposite directions and in paths lying in planes at right angles to said shaft.

7. In a machine of the character described, a plurality of symmetrically arranged, resiliently-supported bodies, a drive shaft extending through and solely supported by said bodies, positive, direct connections between said shaft and said bodies for simultaneously gyrating them in opposite directions and in paths lying in planes at right angles to said shaft, and counter-balanced flywheels mounted on said shaft.

8. In an apparatus of the character described, a plurality of resiliently-supported bodies, a drive shaft solely supported by said bodies, means for resiliently supporting said bodies, said means sustaining said bodies in load-carrying position and being displaceably resilient in vertical and horizontal directions and permitting gyration of the bodies in vertical planes, eccentric means on said shaft for positively gyrating said bodies in opposite directions, and a drive member on said shaft concentric with its self-determined axis of rotation.

9. In an apparatus of the character described, a plurality of symmetrically arranged, resiliently-supported bodies, a drive shaft extending through and solely supported by said bodies, one of the bodies constituting a support for treating materials and the other a companion balancing and supporting means, and means on said shaft for positively and simultaneously gyrating said bodies in opposite directions and in paths lying in planes at right angles to said shaft.

10. In an apparatus of the character described, a plurality of symmetrically arranged, resiliently-supported bodies, a drive shaft extending through and solely supported by said bodies, one of the bodies constituting a support for treating materials and the other a companion balancing and supporting means, means for resiliently supporting said bodies, said means being symmetrically arranged and substantially equal in resilience, and means on said shaft for positively gyrating said bodies in opposite directions with equal magnitude of motion and in paths lying in planes at right angles to said shaft.

11. In a machine of the character described, a plurality of symmetrically arranged, resiliently-supported bodies, a drive shaft extending through and solely supported by said bodies, one of the bodies constituting a support for treating materials and the other a companion balancing and supporting means, and counterweighted balancing wheels mounted on said shaft, said shaft having eccentrics thereon for simultaneously gyrating said bodies in opposite directions and in paths lying in planes at right angles to said shaft.

12. In a machine of the character described, a stationary base, a plurality of gyratory bodies mounted on said base, means for resiliently supporting said bodies, respectively, said means sustaining said bodies in load-carrying position and permitting their gyration in vertical planes, a drive shaft engaging said bodies and solely supported thereby in a substantially horizontal position, and connections between said shaft and said bodies for positively gyrating them in opposite directions and in paths lying in planes at right angles to said shaft.

13. In a machine of the character described, a plurality of symmetrically disposed, resiliently-supported bodies, a drive shaft engaging said bodies and solely supported thereby, and eccentric means in diametrically-opposed relation on said shaft and engaging said bodies for gyrating them in opposite directions about a self-determined axis lying between the axes of said eccentric means.

14. In a machine of the character described, a stationary base, a plurality of resiliently-supported bodies mounted on said base, a drive shaft engaging said bodies, and eccentric means in diametrically-opposed relation on said shaft and engaging said bodies for positively gyrating them in opposite directions about a self-determined axis lying between the axes of the said eccentric means, one of said bodies constituting a support for treating materials and jointly with the other bodies constituting floating supports for the drive shaft.

15. In a machine of the character described, a plurality of symmetrically disposed bodies, means for resiliently supporting said bodies, a drive shaft engaging said bodies and solely supported thereby, said supporting means being disposed on opposite sides of the shaft and at spaced points lengthwise of the shaft, and connections between said shaft and said bodies for positively gyrating them in opposite directions and in paths lying in planes at right angles to said shaft.

16. In a machine of the character described, a plurality of symmetrically disposed bodies of different masses, means for resiliently supporting said bodies in load-carrying position and permitting their gyration in vertical planes, a drive shaft engaging said bodies and solely supported thereby, connections between said shaft and said bodies for positively gyrating them in opposite directions and in paths lying in planes at right angles to said shaft, and balance wheels mounted on said shaft.

17. In a machine of the character described, a plurality of symmetrically disposed, resiliently-supported bodies of different masses, a drive shaft engaging said bodies and solely supported thereby, eccentrics on said shaft in diametrically opposed relation and engaging said bodies for gyrating them in planes at right angles to the shaft and in opposite directions about a self-determined axis lying between the axes of the eccentrics, respectively, and counterweighted flywheels mounted on said shaft.

18. In a machine of the character described, a plurality of resiliently-supported bodies, a drive shaft engaging said bodies and solely supported thereby and substantially coincident with their respective centers of gravity, and connections between said shaft and said bodies for positively gyrating them in opposite directions and in paths lying in planes at right angles to said shaft.

19. In a machine of the character described, a plurality of resiliently-supported gyratory bodies, a drive shaft engaging said bodies and solely supported thereby and extending through said bodies substantially coincident with their respective centers of gravity, eccentrics on said shaft in diametrically opposed relation and engaging the respective bodies for gyrating them in opposite directions about a self-determined axis lying between the axes of said eccentrics, and a drive member on said shaft concentric with its self-determined axis of rotation.

20. In a machine of the character described, a resiliently-supported gyratory body for treating materials, a drive shaft extending through said body, resiliently-supported gyratory bodies at opposite sides of the material-treating body, and through which the drive shaft extends, said bodies constituting floating supports for said shaft, and eccentric means between said shaft and engaging said bodies, respectively, for gyrating them in opposite directions.

21. In a machine of the character described, a stationary base, a body for treating materials resiliently mounted on said base, supports resiliently mounted on said base and parallel to said body, a drive shaft engaging said body and said supports, the body and the supports constituting floating supports for the drive shaft, eccentric means between said shaft and said body and said supports, respectively, for positively gyrating said body and said supports in opposite directions and in paths lying in planes at right angles to the shaft.

22. In a machine of the character described, a gyratory body for treating materials, a drive shaft extending through said body, gyratory bodies disposed alongside the material-treating body and through which the drive shaft extends, eccentric means between said shaft and said bodies, respectively, for positively gyrating them in opposite directions and in paths lying at right angles to the shaft, and means for resiliently supporting said bodies symmetrically at opposite sides of the shaft, the shaft being solely supported by said bodies.

23. In a machine of the character described, a resiliently-supported gyratory screen frame, a drive shaft substantially coincident with the center of gravity of said frame, resiliently-supported gyratory bodies at opposite sides of the screen frame and through which the drive shaft extends, said shaft being substantially coincident with the center of gravity of said bodies and said screen frame and solely supported thereby, and connections between said shaft and said bodies, respectively, for gyrating them in opposite directions.

24. A machine of the character described, comprising a supporting frame, gyratory bearing-bodies resiliently supported on said frame, a screen frame resiliently mounted on said supporting frame between said bodies, and a drive shaft journaled in said bearing-bodies and said screen frame and including actuating means for gyrating said screen-frame vertically in substantially circular paths, said screen frame and bearing-bodies constituting floating supports for the shaft, and actuating means for similarly gyrating said bearing-bodies in directly opposite phase relation to the screen frame.

WALTER J. PARKS.